(12) United States Patent
Kerins (10) Patent No.: US 9,947,242 B2
(45) Date of Patent: Apr. 17, 2018

(54) METHOD FOR PRODUCING ANATOMICAL PHANTOMS WITH CONSTITUENTS HAVING VARIABLE DENSITIES

(71) Applicant: Synaptive Medical (Barbados) Inc., Bridgetown (BB)

(72) Inventor: Fergal Kerins, Toronto (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 688 days.

(21) Appl. No.: 14/337,614

(22) Filed: Jul. 22, 2014

(65) Prior Publication Data

US 2016/0027341 A1  Jan. 28, 2016

(51) Int. Cl.
*G09B 23/30* (2006.01)
*B29C 39/38* (2006.01)
(Continued)

(52) U.S. Cl.
CPC ............. *G09B 23/30* (2013.01); *B29C 39/10* (2013.01); *B29C 39/38* (2013.01); *G09B 23/34* (2013.01);
(Continued)

(58) Field of Classification Search
CPC ........ G09B 23/30; G09B 23/34; B29C 39/10; B29C 39/38; B29K 2105/24;
(Continued)

(56) References Cited

U.S. PATENT DOCUMENTS

2008/0076101 A1   3/2008  Hyde et al.
2010/0041005 A1*  2/2010  Campbell ............... G09B 23/28
                                              434/267
(Continued)

FOREIGN PATENT DOCUMENTS

CA   2675217 A1   8/2008
WO   9816266 A1   4/1998
WO   201135410 A1 3/2011

OTHER PUBLICATIONS

International Search Report from PCT/CA2015/050545 dated Oct. 9, 2015.

(Continued)

*Primary Examiner* — Robert J Grun
(74) *Attorney, Agent, or Firm* — Quarles & Brady LLP (57) ABSTRACT

The present disclosure discloses a method of producing an anatomical phantom of an anatomical part having components of different density. The method includes providing a mold of an anatomical part, providing a mold having a size and shape corresponding to a first constituent of the anatomical part. A first liquid is place into the constituent mold and frozen which is placed into the larger anatomical mold and supported in a location corresponding to an actual location of the part in an actual anatomical part. The larger mold is then filled with a second liquid, which forms a gel after a freeze/thaw cycle, to encase the frozen first liquid in the second liquid and the temperature is dropped to freeze the second liquid. The combination is then thawed to produce an anatomical phantom of the anatomical part having a continuous seam between the first constituent part and a remainder of the anatomical part represented by the polyvinyl alcohol based gel. The first and second liquids have a composition such that upon undergoing one freeze thaw cycle, products resulting from the freeze thaw cycle have different densities approximating different constituents of the anatomical part with the second product being a gel encapsulating the first product.

24 Claims, 5 Drawing Sheets

(51) Int. Cl.
  *B29C 39/10* (2006.01)
  *G09B 23/34* (2006.01)
  *B29K 29/00* (2006.01)
  *B29K 33/04* (2006.01)
  *B29K 83/00* (2006.01)
  *B29K 105/00* (2006.01)
  *B29K 105/24* (2006.01)

(52) U.S. Cl.
  CPC ...... *B29K 2029/04* (2013.01); *B29K 2033/04* (2013.01); *B29K 2083/005* (2013.01); *B29K 2105/0061* (2013.01); *B29K 2105/24* (2013.01)

(58) Field of Classification Search
  CPC ........ B29K 2105/0061; B29K 2033/04; B29K 2029/04; B29K 2083/005
  See application file for complete search history.

(56) References Cited

U.S. PATENT DOCUMENTS

2016/0155364 A1* 6/2016 Piron ............... G01R 33/58
  434/270
2016/0297119 A1* 10/2016 Richmond ............. B29C 39/22

OTHER PUBLICATIONS

Written Opinion from PCT/CA2015/050545 dated Oct. 9, 2015.
Iryanti Fatysari Nata et al., A chitin nanofibril reinforced multifunctional monolith poly(vinyl alcohol) cryogel, Journal of Materials Chemistry B, 8, 2014, 2, 4108-4133.

* cited by examiner

METHOD FOR PRODUCING ANATOMICAL PHANTOMS WITH CONSTITUENTS HAVING VARIABLE DENSITIES

FIELD

The present disclosure relates to a method of producing anatomical phantoms having variable density anatomical components.

BACKGROUND

Realistic anatomical phantoms are very useful for many reasons, including but not limited to training of surgeons or other clinicians for practicing medical procedures. For these applications the most useful phantoms are constructed to provide realistic biomechanical properties of actual tissue regions being operated or passed through during the medical procedure. Such a phantom must therefore approximate as close as possible actual tissue being encountered in the procedure, for example, healthy tissue is generally biomechanically different from tumor tissue, when the procedure is tumor resection. Also, in the example of the brain, various sub-anatomical structures within the organ can differ in firmness and their locations and distances from a surgical target can be used to plan the best trajectory to a chosen target. Thus a realistic phantom would contain tissue mimic materials for each type of tissue likely to be encountered during the medical procedure. The different types of tissue/tumor may be characterized by different tissue density, location and orientation. For example tumors are not usually characterized by oriented tissue (as are muscle tissue, ligaments, tendons etc.) and are typically of different density compared to healthy tissue.

One type of anatomical phantom being used are made of cryogel materials. Currently, phantoms produced of cryogel structures containing domains of various density are prepared by producing the different domains separately and assembling these variable density domains together to give a fabricated product containing the multi-density domains. This technique is limiting in that at least one structure prepared from cryogel must go through two freeze thaw cycles (FTC) which limits the minimum rigidity that can be achieved since repeated FTC's increase this property. Thus, currently, a rigid material must be penetrated or cut to allow backfilling with a solution of a different consistency to give a multi-density domain structure in which the resulting structure is characterized by discontinuities or gaps/seams between the different structures. The issues of limited minimum rigidity and discontinuous domains are obstacles to the level of detail that can be achieved.

Accordingly, it would be beneficial to provide a method would allow production of anatomical phantoms having seamless domains of various densities to be produced.

SUMMARY

The present disclosure discloses a method of producing an anatomical phantom of an anatomical part having components of different density, comprising:
a) providing a mold of an anatomical part;
a) providing a constituent mold having a size and shape corresponding to a constituent part of the anatomical part, placing a liquid into the constituent mold;
b) freezing the liquid in the constituent mold;
c) placing the frozen liquid into the mold and supporting the frozen liquid in a location in the mold corresponding to an actual location of a constituent part in an actual anatomical part;
d) filling the mold with a hydrogel liquid precursor to encase the frozen liquid in the hydrogel liquid precursor;
e) freezing the hydrogel liquid precursor; and
f) thawing the frozen liquid and the frozen hydrogel liquid precursor together to produce a hydrogel enveloped thawed frozen liquid having a continuous seam between the constituent of the anatomical part formed by the thawed frozen liquid and a remainder of the anatomical part formed by the hydrogel, and wherein the liquid and the hydrogel liquid precursor have a composition selected such that upon being thawed together, a product of the thawed frozen liquid and the hydrogel have different densities.

Another embodiment disclosed herein includes a method of producing a hydrogel-based anatomical phantom of an anatomical part having components of different density, comprising:
a) providing a mold of an anatomical part;
a) providing a constituent part having a size, shape and density corresponding to a real constituent part of a real anatomical part and placing the constituent part into the mold and supporting it in a location in the mold corresponding to an actual location of the real constituent part in the real anatomical part;
d) filling the mold with a hydrogel liquid precursor to encase the constituent part in the hydrogel liquid precursor; and
e) exposing the hydrogel liquid precursor to a cross linking agent to induce cross linking in the hydrogel liquid precursor to produce a hydrogel, the hydrogel liquid precursor being selected to have a composition such that once cross linked, the resulting hydrogel exhibits a density corresponding to a density of tissue in the anatomical part being represented by the hydrogel.

There is provided a method of producing a hydrogel-based anatomical phantom of an anatomical part having components of different density, consisting essentially of the steps:
a) providing a mold of an anatomical part;
a) providing a constituent mold having a size and shape corresponding to a constituent part of the anatomical part, placing a liquid into the constituent mold;
b) freezing the liquid in the constituent mold;
c) placing the frozen liquid into the mold and supporting the frozen liquid in a location in the mold corresponding to an actual location of a constituent part in an actual anatomical part;
d) filling the mold with a hydrogel liquid precursor to encase the frozen liquid in the hydrogel liquid precursor;
e) freezing the hydrogel liquid precursor; and
f) thawing the frozen liquid and the frozen hydrogel liquid precursor together to produce a hydrogel enveloped thawed frozen liquid having a continuous seam between the constituent of the anatomical part formed by the thawed frozen liquid and a remainder of the anatomical part formed by the hydrogel, and wherein the liquid and the hydrogel liquid precursor have a composition selected such that upon being thawed together, a product of the thawed frozen liquid and the hydrogel have different densities.

A further understanding of the functional and advantageous aspects of the invention can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, "hydrogels" refer to materials that are formed by crosslinking polymer chains, through physical, ionic or covalent interactions and are known for their ability to absorb water. An example of a physical interaction that can give rise to a hydrogel is by thermal treatment of the liquid hydrogel precursor which, prior to being subjected to a freeze thaw cycle is a liquid or near liquid. The process of freezing the liquid precursor acts to freeze the water contained in the polymer/water mixture and ice particles causes the polymer strands to be topologically restricted in molecular motion by other chains thus giving rise to the "entanglement' cross linking to produce the hydrogel. Hydrogels that have been produced by a freeze that cycle are sometimes referred to as "cryogels".

Hydrogels characterized by cross linking that are produced through ionic or covalent interactions typically require a cross linking (XL) agent and/or an initiator and activation by methods such as heat or radiation.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the term "patient" is not limited to human patients and may mean any organism to be treated using the planning and navigation system disclosed herein.

Figure 1:
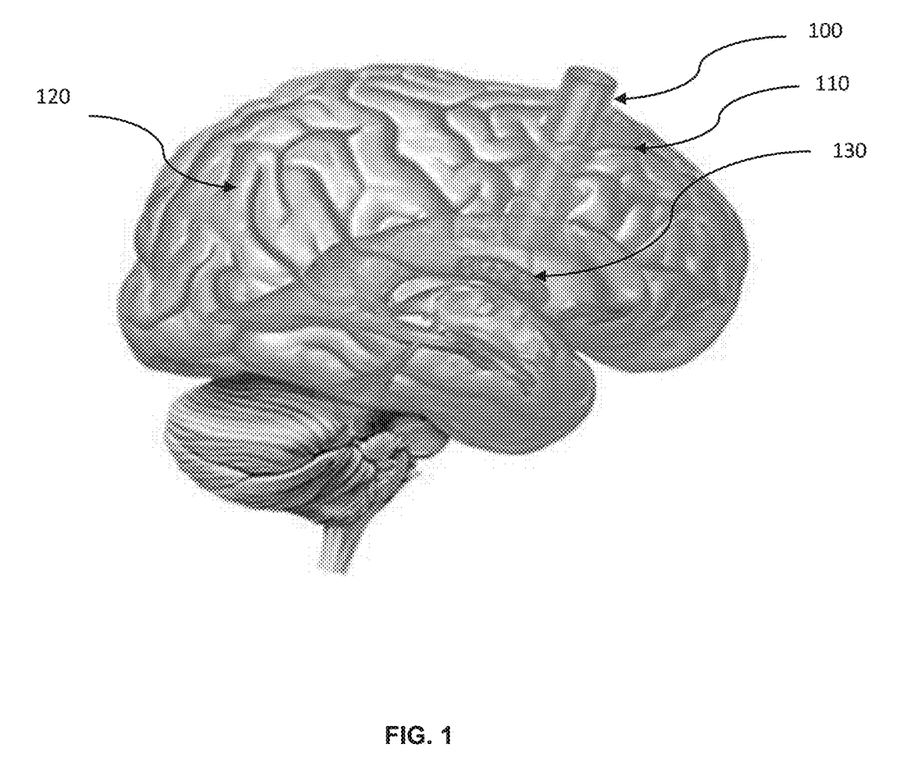
FIG. 1 is an illustration of an example port-based surgical approach. A port is inserted along the sulci to approach a tumor located deep in the brain.

When performing surgical and/or diagnostic procedures that involve the brain, neurosurgical techniques such as a craniotomy, or a minimally invasive procedure such as an endo-nasal surgery or a port based surgical method, may be performed to provide access to the brain. In such procedures, as indicated, the medical procedure is invasive of the mammalian head. For example, in the port-based surgical method illustrated in FIG. 1, a generally cylindrical port (100) is inserted along the sulci (110) of the brain (120) to access a tumor (130) located deep in the brain. The cylindrical port (100) provides the surgeon with access to the interior portion of the patient's brain being operated on.

According to embodiments provided herein, the simulation of such procedures may be achieved by providing a brain model that is suitable for simulating the surgical procedure through one or more layers of the head. Such a procedure may involve perforating, drilling, boring, punching, piercing, or any other suitable methods, as necessary for an endo-nasal, port-based, or traditional craniotomy approach. For example, some embodiments of the present disclosure provide brain models comprising an artificial skull layer that is suitable for simulating the process of penetrating a mammalian skull. As described in further detail below, once the skull layer is penetrated, the medical procedure to be simulated using the training model may include further steps in the diagnosis and/or treatment of various medical conditions. Such conditions may involve normally occurring structures, aberrant or anomalous structures, and/or anatomical features underlying the skull and possibly embedded within the brain material.

In some example embodiments, the brain model is suitable for simulating a medical procedure involving a brain tumor that has been selected for resection. In such an example embodiment, the brain model is comprised of a brain material having a simulated brain tumor provided therein. This brain material simulates, mimics, or imitates at least a portion of the brain at which the medical procedure is directed or focused.

The simulation of the above described medical procedure is achieved through simulation of both the surgical procedure and the associated imaging steps that are performed prior to surgery (pre-operative imaging) and during surgery (intra-operative imaging). Pre-operative imaging simulation is used to train surgical teams on co-registration of images obtained through more than one imaging methodology such as magnetic resonance (MR), computed tomography (CT) and positron emission tomography (PET). Appropriate co-registration geometrically aligns images from different modalities and, hence, aids in surgical planning step where affected regions in the human body are identified and suitable route to access the affected region is selected. Another use of pre-operative imaging is to train the surgical team and radiologists on optimizing the imaging parameters so that clinically relevant images are acquired prior to the surgical procedure. For example, pre-operative MR images need to be acquired in a specific manner to ensure that the acquired data can be used to generate tractography information, such as Diffusion Tensor Imaging (DTI), which shows the location and direction of the brain tracks which are not visually observable by the surgeon. Intra-operative imaging is used to guide the surgeon through accurate surgical intervention while avoiding damaging the brain tracks if possible. Surgical intervention includes accessing a previously identified affected region in the human body and subsequent resection of affected tissue.

Referring to FIGS. 2-5, an exploded view of an example model or phantom shown generally at (250) is provided that is suitable for use in training or simulation of a medical procedure which is invasive of a mammalian head. The training model (250) may be adapted or designed to simulate any mammalian head or a portion thereof. It is to be understood that the person to be trained may be selected from a wide variety of roles, including, but not limited to, a medical doctor, resident, student, researcher, equipment technician, or other practitioner, professionals, or personnel. In other embodiments, the models provided herein may be employed in simulations involving the use of automated equipment, such as robotic surgical and/or diagnostic systems.

Figure 2:
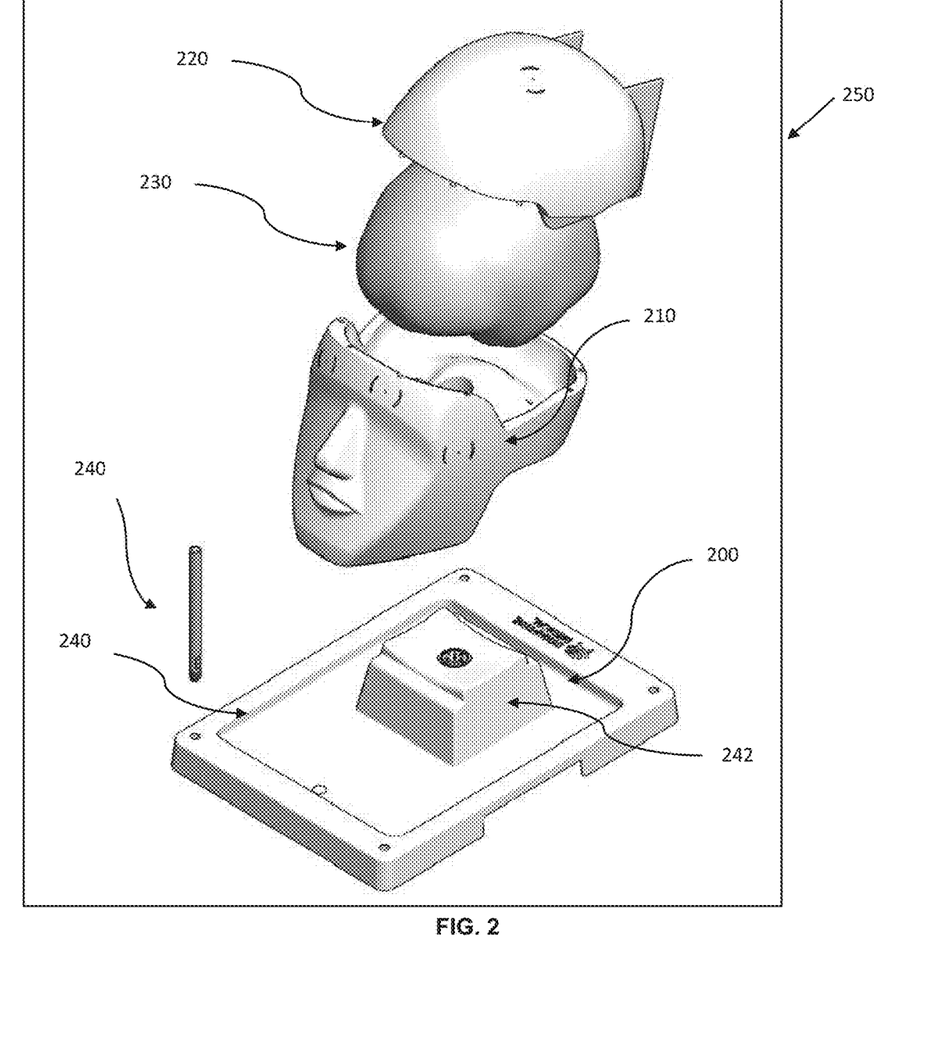
FIG. 2 is an illustration of an example training model in an exploded view, illustrating parts of the base component and the training component.

Referring now to FIG. 2, an exploded view of an example implementation of training model (250) is shown that includes a base component and a training component. The base component is comprised of a tray component (200) and a head component. The head component is comprised of a bowl component (210) and a skull component (220). The training component may be comprised of a brain (230) with the following layers: dura, CSF (cerebro spinal fluid), vessels, white matter, grey matter, fiber bundles or tracks, target tumors, or other anomalous structures. The training component may also include the aforementioned skull component (220) when crafted in a skull mimicking material. Optionally, the training model (250) may be also comprised of a covering skin layer (not shown). Further, the base component may include a holder (240) provided on the tray (200) to facilitate easy mounting of fiducials or reference points for navigation.

Referring to FIG. 2, the tray component (200) forming part of the base component defines a training receptacle which includes a pedestal section (242) which is sized and configured for receipt of the bowl component (210) therein. Thus the training component is sized, configured or otherwise adapted to be compatible with, or complementary to the base component, and particularly the training component receptacle, such that the base component and the training component may be assembled to provide the assembled training model (250).

The base component may have any size, shape and configuration capable of maintaining the training component, mounted within the training component receptacle, in a position suitable for performing the medical procedure to be trained. This base component comprises features that enable registration, such as fiducials, touchpoint locations, and facial contours for 3D surface scanning, MR, CT, optical coherence tomography (OCT), ultrasound (US), PET, optical registration or facial registration. Furthermore, the base component is adapted or configured to maintain the training component in a relatively stable or fixed position throughout the performance of the medical procedure to be simulated during the training procedure. The base component provides both mechanical support during the training procedure and aids in the proper orientation of the training components to mimic actual positioning of a patient's head during the surgical procedure.

Figure 3:
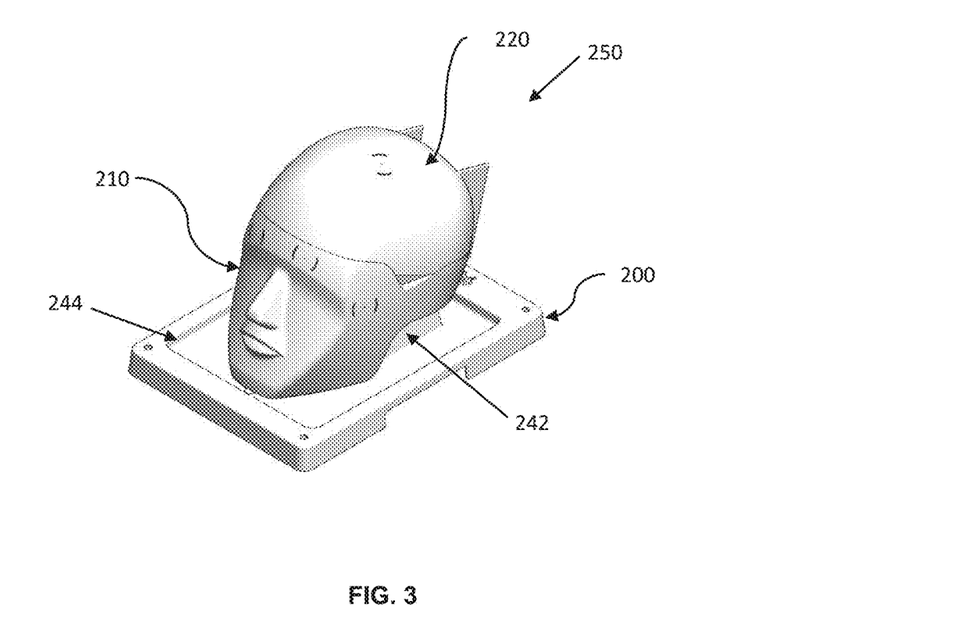
FIG. 3 is an illustration of an example base component of the training model illustrating the tray, the head and the skull.

Referring to FIGS. 2 and 3, as noted above, the base component may be comprised of a head component (210) and a tray component (200). The tray component (200) is sized, configured or otherwise adapted to be compatible with, or complementary to the head component (210). The tray component (200) and pedestal (242) are adapted or configured to maintain the head component (210) in a relatively stable or fixed position throughout the performance of the imaging or medical procedure to be simulated. This may be accomplished with the use of a mechanical feature such as a snap mechanism that exists to affix the head component (210) to the tray component (200). The tray component (200) may contain a trough (244) to catch liquids, and insertion points to affix hardware to aid with image registration and/or the medical procedure to be trained.

The head component (210) is sized, configured or otherwise adapted to be compatible with, or complementary to the tray component (200) and the training component (230). The head (bowl) component (210) is adapted or configured to maintain the training component (230) (located under skull component (220)) in a relatively stable or fixed position throughout the performance of the medical procedure to be simulated. This head component (210) is adapted or configured to enable anatomically correct surgical positioning. This may include affixing the head component (210) with a surgical skull clamp or headrest, for example a Mayfield skull clamp. This head component (210) is also adapted or configured to enable anatomically correct imaging positioning for any contemplated imaging modality including, but not limited to, MR, CT, OCT, US, PET, optical registration or facial registration. For example the head component (210) may be positioned in a supine position within an magnetic resonance imaging (MRI) apparatus to enable anatomically accurate coronal image acquisition.

In some embodiments, the head component (210) is shaped or configured to simulate a complete or full skull. In other words, the training component comprises bowl section (210) and skull section (220), while the bowl section (210) comprises a further portion of a complete skull and head. In some embodiments, as shown in FIG. 2, the head component i.e., bowl section (210) and skull section (220), and training component (230) together provide a complete simulated skull or together provide a simulated head including skull (220) and brain (230). The simulated head provided by the training model (250) enhances the reality of the overall simulation training experience.

Figure 4:
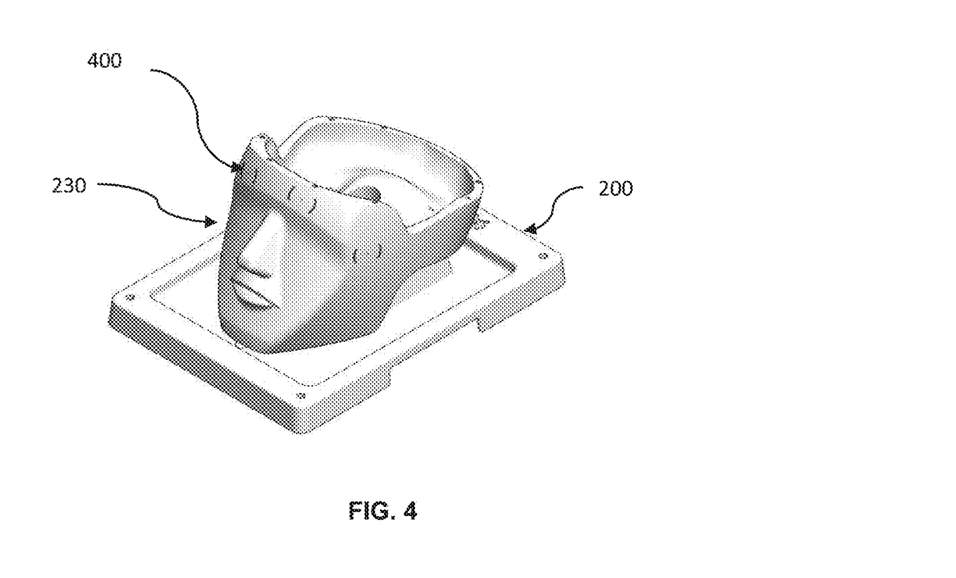
FIG. 4 is an illustration of an example base component of the training model without the skull section, illustrating fiducials that are important for registration of images acquired using different modalities.

In addition, the base and training components of the training model (250), and particularly the head component, may also include one or more external anatomic landmarks or fiducial locations (400), as shown in FIG. 4, such as those likely to be relied upon by the medical practitioner for image registration for example, touchpoints, the orbital surface, nasal bone, middle nasal concha, inferior nasal concha, occipital bone, nape, and nasal passage. These features will aid in registering the training component with the preoperative images, such as MR, CT, OCT, US, PET, so that the surgical tools can be navigated appropriately.

In this regard, navigation to establish the location of the hole or passage through the skull of the patient during the craniotomy procedure is often critical for the success of the medical procedure. Accordingly, external anatomic landmarks and/or touchpoints are provided by the simulated head in order to provide training on the correct registration of the training model with the acquired images. These anatomic landmarks and/or touchpoints may be utilized for attaching registration hardware, for example a facial registration mask or fiducial landmark. Thus, the training model (250), and particularly the simulated head, including the brain (230), bowl (210) and skull cap (220), are sized, configured and shaped to approximate and closely resemble the size, configuration and shape of the head of a patient on which the medical procedure is to be performed. In other words, the head component may be both 'life-like' and 'life-sized'.

The base component may be comprised of any composition or material suitable for providing the training component receptacle, and may be suitable for being cast, molded or otherwise configured to provide or support the simulated head when assembled with the training component. For instance, the base component may be comprised of any suitable casting compound, casting composition or plaster. The base component may be comprised of a material that is rigid, non-reflective, non-ferrous, non-porous, cleanable, and lightweight, for example a urethane or acrylonitrile butadiene styrene (ABS). In addition, the bowl (210) and skull (220) components of the base component may be comprised of a material that is visible by the imaging procedure of interest to enable registration. The material for the bowl (210) and skull cap (220) components of the base may therefore be selected to be visible by MR, CT, and/or PET.

Figure 5:
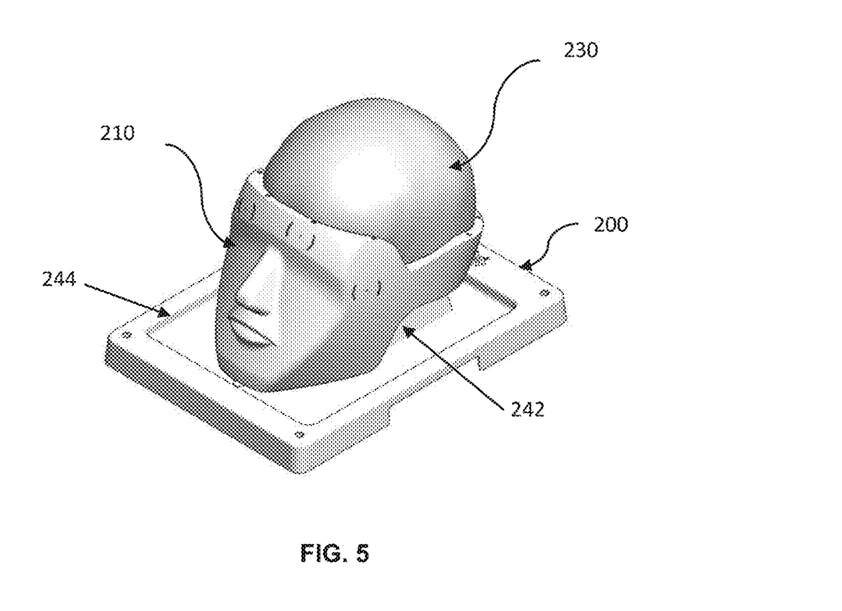
FIG. 5 is an illustration of an example base component of the training model, shown containing the training component.

As shown in FIG. 5, the training component (230) and the base component (210) are complementary or compatible such that when the training component (230) is mounted on the pedestal (242) in the training component receptacle (244) in tray (200), together they provide the training model (250) with the skull cap (220) removed. Furthermore, the configuration and dimensions of the training component (230) and the bowl component (210) are complimentary or compatible such that the training component (230) may be received and fixedly or releasably mounted in the bowl component (210).

In some embodiments, in order to permit the replacement or substitution of the training component (230), the training component is detachably or releasably mounted in the bowl component (210). Any detachable or releasable fastener or fastening mechanism may be used which is capable of securing the training component (230) in the receptacle, while also permitting the training component (230) to be readily detached, released or removed as desired or required. In one embodiment, the training component (230) is releasably or detachably mounted within the bowl component (210), specifically the training component is held within the bowl component (210) to emulate the mechanical fixation of the brain component (230) in the skull (220).

Thus, in the present example embodiment, the training component (230) may be removed from the bowl component (210) and replaced with an alternate, replacement or substitute training component as desired or required by the user of the training model (250). For instance, a replacement training component (230) may be required where the previous training component (230) is damaged or modified during the training of the procedure. An alternate training component (230) may be adapted or designed for use in the training of the performance of a specific medical procedure or condition of the patient, allowing for the reuse of the bowl component (210).

Alternatively, as indicated, the training model (250) may not include the bowl component (210). In this instance, the other components comprising the training model (250), such as the training component (230) in isolation, may be supported directly by a supporting structure or a support mechanism (not shown) that does not look like a mammalian head. Specifically, the supporting structure may securely maintain the training component (230), without the other components of the training model, in the desired orientation. In such an embodiment, the training component (230) may be releasably attached or fastened with the supporting structure such that the training component (230) may be removed from the supporting structure and replaced with an alternate, replacement or substitute training component (230) as desired or required by the user of the training model (250).

The present invention is directed to a method of producing an anatomical phantom of an anatomical part having components of different density, which represent densities of actual constituent parts of the anatomical part. Initially, a mold of the anatomical part is produced. In the case that the anatomical phantoms are for general training purposes, and not patient specific, they may be generic and the size, shape and constituent components of the anatomical part may be obtained from anatomical atlases. If on the other hand they are for patient specific training, the mold of the anatomical part may be obtained by preoperative imaging of the patient's anatomical part, such as but not limited to x-ray, positron emission spectroscopy (PET), magnetic resonance imaging (MRI), optical coherence tomography (OCT), ultrasound (US), or simply laser surface scanning of the anatomical part, to mention a few.

Once the mold of the anatomical part has been produced, a constituent mold is produced of one or more constituents to be included in the phantom. These constituents may be other anatomical components of the anatomical part, for example, if the anatomical part is a patient's brain, the other constituents may be various structural components, such as grey matter versus white matter, white matter fiber tracts, tumors located in one or more locations to mention just a few. This constituent mold is produced having a size and shape corresponding to the particular constituent(s) it is representative of. For example, if the constituent being represented is a brain tumor, the tumor mold is produced from the preoperative images from which the size and shape are obtained.

A first liquid is then placed into the constituent mold and then is frozen after which the frozen liquid is placed into the larger anatomical mold and placed and supported in a location in the mold corresponding to an actual location of the constituent part in an actual anatomical part. The mold material from which the constituent mold is produced may be removed once the first liquid is frozen or it may be left in place encapsulating the frozen liquid.

This first liquid is selected on the basis that, upon being subjected to one freeze/thaw cycle, it has physical properties, such as but not limited to, density, tactile features, haptic responses and imagability (to mention just a few examples) that closely resemble the actual anatomical constituent it is representing. The first liquid may be an aqueous solution of poly(vinyl alcohol) (PVA) in water, an oil or wax, a solution of a contrast agent in water, or water and PVA, a salt or carbonate solution in water, or water and PVA, or a suspension of nanoparticles, non-limiting examples being anatase or rutile titania, silica, calcium carbonate, calcium chloride, and talc in water, or water and PVA, or a suspension of fiberous materials such as cotton, silicone rubber and chitin, in water or water and PVA, such that the formulation gives the desired rheological properties, haptic responses and imagable characteristics after one freeze-thaw cycle.

In addition, the various sections incorporate any one or combination of tinted, colored and pigmented nanoparticles thereby giving the ability to represent lifelike colors and tones for the tissue.

If phantoms are being produced using the present method involving a structure such as a lesion or tumor protruding through the outer surface of the material then the then materials that are liquid after the thaw cycle are not appropriate.

If the phantom is being produced with only one constituent part, such as tumor, then the mold is then filled with a second liquid, which after being subjected to the freeze/thaw cycle, forms the material representative of the rest of the anatomical part in respect of density, tactile properties, haptic responses and imagability to mention just a few examples. The second liquid is selected so that upon being subjected to a freeze/thaw cycle it is a cyrogel material, such as, but not limited to a polyvinyl alcohol cyrogel (PVA-C). It is poured into the anatomical mold to surround the frozen first liquid constituent, to embed the frozen first liquid constituent in the second liquid. The combination is then cooled to freeze the second liquid around the first frozen liquid, and once frozen the combination of frozen first and second liquids are thawed. The first and second liquids are selected such that the first and second products resulting from the first and second liquids having undergone the freeze thaw cycle have different densities approximating different constituents of the anatomical part with at least the second product being a gel encapsulating the first product. The resulting anatomical phantom of the anatomical part has a continuous seam between the first constituent part and a remainder of the anatomical part represented by the gel.

In an alternative embodiment, other hydrogel materials that may be used in addition to PVA-C may include, but are not limited to, poly(N-isopropyl acrylamide) and a suitable cross-linker (XL) such as N,N'-Methylenebisacrylamide or N,N'-cystamine-bis-acrylamide. Other XL agents may also be used include, but are not limited to, tetramethylenediamine).

In another embodiment, a blend of silicone rubber with hydrogel monomers which can include N-Vinyl pyrrolidone, methacrylic acid, acrylic acid, poly-2-hydroxyethyl methacrylate may be used as the hydrogel. Other substituted methacrylate and acrylates can be used to tune the desired properties of the resulting hydrogel, for example systems based on a combination of the above are used in contact lenses and may be used in the present invention. The process of producing the phantom in these last two embodiments discussed just above do not involve freeze-thaw cycles.

In another embodiment, a PVA-based cyrogel based on the use of a blend of PVA and chitin may used. As disclosed in C. Lee and I. F. Nata, J. Mater. Chem. B, 2014, DOI: 10.1039/C4TB00175C; a polymer of N-acetylglucosamine, which when crosslinked with glutaraldehyde, reinforces the 'sponginess' quality of the cryogel.

If a phantom is being produced with more than one constituent, for example multiple tumors in multiple locations, multiple anatomical constituents of which the anatomical part is made, for example muscle tissue, tendon tissue, ligament tissue, blood vessels, etc., then these additional constituents would be produced from various appropriate liquid materials placed into constituent molds of appropriate size and shape, frozen and then supported in the larger phantom of the anatomical part, and the liquid of the remaining portion of the phantom poured into the larger phantom, and the entire combination continuing to be frozen until all the liquids are frozen, after which the entire assembly is thawed.

Figure 6:
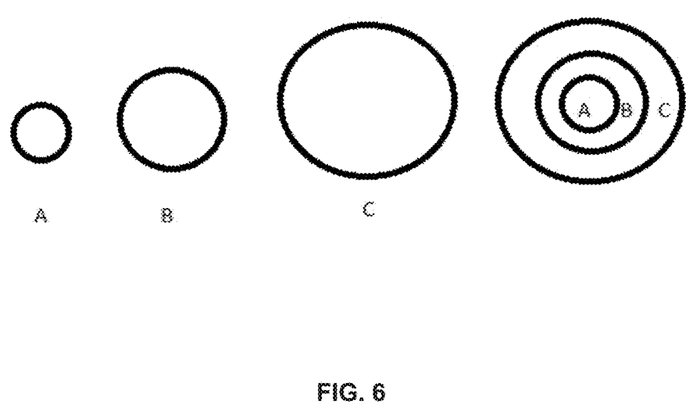
FIG. 6 is a diagram showing an idealised representation of a complex domain, with three generally spherical volumes of different sizes and shape that can nest one inside the other such that each inner circle is encased by its surrounding domain.

As a non-limiting example, when producing a phantom of an anatomical part, for example a brain phantom built up using as shown in FIG. 6, with the constituents nested one inside the another, an innermost frozen domain may be formulated to simulate blood vessel content and the encapsulating material is formulated to simulate blood vessels.

In another non-limiting example, when producing a phantom of an anatomical part, for example a brain phantom built up using as shown in FIG. 6, with the constituents nested one inside the another, an innermost frozen domain may be formulated to simulate the lymphatic system fluid and the encapsulating material is formulated to simulate lymphatic vessels and nodes.

In an embodiment, all the constituents of the phantom are produced using PVA-C, with each constituent being produced with a different composition to give the final product after the single freeze-thaw cycle a density different from the other constituents.

The present method will be illustrated using the following non-limiting examples.

Example 1

This example is an example for the preparation of a simulation low-cellularity tumor consisting of a low-viscosity fluid or gel within a more rigid shell. A solution of material for a more fluid interior is prepared (e.g. a suitably low wt % PVA in water, water only or an alternative solution) and a portion is frozen into the internal shape required e.g. by using a silicone mold. While frozen to a suitably low temperature to prevent thawing, this frozen piece is placed into a larger mold constructed to represent the anatomical part of interest (e.g. a silicone mold) that contains pins orientated as to hold the frozen piece and a solution of a higher wt. % PVA solution is poured over, enclosing the low wt % solution in one of a higher concentration.

The 'freeze' step of the cycle is then continued until the high wt % solution is solid enough to support the inner structure and the pins removed, then completely frozen and the two solutions are thawed together to give a mock low cellularity tumor containing domains with different tactile properties, in this case a viscous gel/liquid and an outer harder shell with no seam.

Extending this method to include more steps and the combination of a variety of frozen materials could allow the creation of more complex organs (and organ components) within the same freeze thaw cycle without limiting the minimum rigidity that can be achieved.

Example 2

Referring again to FIG. 6, there is shown a diagram showing an idealized representation of a complex domain, with three spheres of different sizes that are nested one inside the other such that each inner circle enclosing material of one density is encased by its surrounding domain of material of another density. The fabrication of this exemplary, idealized structure from cryogel precursors is as follows: the formulation for domain A is frozen in a suitably sized and shaped mold, removed and while frozen, is inserted into the mold for domain B. The formulation for domain B is added, then frozen and the entire process repeated for domain C in a third mold. Once the formulation for domain C is frozen, the entire assembly is thawed together to give the completed structure 'ABC', containing three layered domains, without edges or seams, where the consistency of any domain is independent of its location within the structure and the whole integrated structure has been subjected to one freeze-thaw cycle, albeit the freezing process is longer for the first frozen domain(s). As noted with Example 1 above, the outer domain C is produced using a cryogel precursor material such that once it is subjected to a freeze thaw cycle the resulting product is a cryogel.

In an embodiment, during the freeze cycle the cryogel precursor may be cooled to a temperature low enough to form ice, for example in a range from 0° C. to −22° C. In another embodiment of the method it may be cooled to a temperature in a range from −5° C. to −15° C. In another embodiment it may be cooled to a temperature in a range from −8° C. to −12° C. In yet another embodiment it may be cooled to a temperature of −10° C. Phantoms produced at different temperatures and concentrations of the cryogel precursor will exhibit differences in rheological, tactile, haptic properties so that phantoms may be produced with desirable properties depending on the concentration and final cooling range.

In an embodiment, there is provided a method of producing a hydrogel-based anatomical phantom of an anatomical part having components of different density in a single overall freeze-thaw cycle. The method consists essentially of providing a mold of an anatomical part, providing a constituent mold having a size and shape corresponding to a constituent part of the anatomical part, placing a liquid into the constituent mold, freezing the liquid in the constituent mold, placing the frozen liquid into the mold and supporting the frozen liquid in a location in the mold corresponding to an actual location of a constituent part in an actual anatomical part, filling the mold with a hydrogel liquid precursor to encase the frozen liquid in the hydrogel liquid precursor, freezing the hydrogel liquid precursor, and thawing the frozen liquid and the frozen hydrogel liquid precursor together to produce a hydrogel enveloped thawed frozen liquid having a continuous seam between the constituent of the anatomical part formed by the thawed frozen liquid and a remainder of the anatomical part formed by the hydrogel, and wherein the liquid and the hydrogel liquid precursor have a composition selected such that upon being thawed together, a product of the thawed frozen liquid and the hydrogel have different densities.

While the Applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

What is claimed is:

1. A method of producing a hydrogel-based anatomical phantom of an anatomical part having components of different density using multi-stage freezing and a single thawing step, comprising:
   a) providing a mold of an anatomical part;
   b) providing a constituent mold having a size and shape corresponding to a constituent part of the anatomical part, placing a liquid into the constituent mold;
   c) a first freezing step further consisting of freezing the liquid in the constituent mold to produce a frozen constituent part;
   d) removing the frozen constituent part from the constituent mold and placing the frozen constituent part into the mold and supporting the frozen constituent part in a location in the mold corresponding to an actual location of the constituent part in an actual anatomical part;
   e) filling the mold with a hydrogel liquid precursor to encase the frozen constituent part in the hydrogel liquid precursor;
   f) a second freezing step further comprising freezing the hydrogel liquid precursor; and
   g) thawing the frozen constituent part and the frozen hydrogel liquid precursor together to produce a hydrogel enveloped thawed frozen constituent part having a continuous seam between the constituent part of the anatomical part formed by the thawed frozen constituent part and a remainder of the anatomical part formed by the hydrogel, and wherein the liquid and the hydrogel liquid precursor have a composition selected such that upon being thawed together, a product of the thawed frozen constituent part and the hydrogel have different densities.

2. The method according to claim 1 including providing additional constituent molds each having a shape and size representative of selected additional constituents of the anatomical part, and including placing additional liquids into each of the additional constituent molds and freezing the liquid in each additional constituent mold to produce additional constituent parts, and wherein step c) includes supporting the additional frozen constituent pars in locations in the mold corresponding to actual locations of the additional constituents in an actual anatomical part, and wherein step g) includes thawing the additional frozen constituent parts at the same time the frozen constituent part and the frozen hydrogel liquid precursor are thawed together, and wherein additional products resulting from the additional liquids having undergone thawing have different densities approximating densities of the additional constituents of the anatomical part.

3. The method according to claim 1 wherein steps b) and c) are repeated for a pre-selected number of constituent molds and the same pre-selected number of liquids, wherein each constituent mold in ascending order has a size and shape configured to receive therein a liquid frozen by a previous constituent mold such that each frozen constituent part contains nested therein a liquid frozen in the previous constituent mold so that the pre-selected number of liquids, in frozen form, are in a nested relationship with each other, and wherein step d) includes placing the nested frozen constituent parts into the mold.

4. The method according to claim 1 wherein the liquid hydrogel precursor comprises polyvinyl alcohol such that the hydrogel is polyvinyl alcohol cryogel (PVA-C).

5. The method according to claim 1 wherein the liquid is polyvinyl alcohol having a composition different from the polyvinyl alcohol of the liquid hydrogel precursor.

6. The method according to claim 2 wherein the liquid hydrogel precursor comprises polyvinyl alcohol such that the hydrogel is polyvinyl alcohol cryogel (PVA-C).

7. The method according to claim 2 wherein the additional liquids are polyvinyl alcohol having a composition different from the polyvinyl alcohol of the liquid hydrogel precursor.

8. The method according to claim 3 wherein all the liquids include polyvinyl alcohol hydrogel (PVA-C) solutions having different concentrations such that the resulting hydrogels have different densities.

9. The method according to claim 1 wherein the liquid comprises any one or combination of poly(vinyl alcohol) (PVA) in water, oil, wax, a solution of a contrast agent in water, a solution of a contrast agent in water and PVA, a salt or carbonate solution in water, a salt or carbonate solution in water and PVA, a suspension of nanoparticles in water, a suspension of nanoparticles in water and PVA, a suspension of fibrous materials in water, a suspension of fibrous materials in water and PVA.

10. The method according to claim 1 wherein the nanoparticles comprise any one or combination of anatase titania, rutile titania, silica, calcium carbonate, calcium chloride, talc, any one or combination of tinted, colored and pigmented nanoparticles.

11. The method according to claim 1 wherein the fibrous material comprises any one or combination of cellulose, cotton, silicone rubber, and chitin.

12. The method according to claim 1 wherein step a) of providing a mold of an anatomical part and step b) of providing the constituent mold of a constituent part of the anatomical part includes producing a mold of a generic anatomical part and of the constituent mold obtained from an anatomical atlas.

13. The method according to claim 1 wherein the step a) of providing a mold of an anatomical part and the step b) of providing the constituent mold includes acquiring preoperative imaging of the anatomical part and the constituent part of a patient requiring a medical procedure, and based on the preoperative imaging producing the mold and the constituent mold, and positioning said frozen first liquid in said mold in a location consistent with the location of the constituent part in the preoperative imaging.

14. The method according to claim 13 wherein the constituent part in the anatomical part is any one of a tumor, lesion, blood clot or sub-anatomical structure in the patient.

15. The method according to claim 13 wherein the anatomical part is a patient's brain.

16. The method according to claim 3 where an innermost frozen domain is simulated blood vessel content and the encapsulating material is simulated blood vessel.

17. The method according to claim 3 where an innermost frozen domain is simulated lymphatic system content and the encapsulating material is simulated vessels and nodes.

18. The method according to claim 4 wherein the polyvinyl alcohol is present in an amount in a range from 2 to 20 wt %.

19. The method according to claim 18 wherein the polyvinyl alcohol is cooled to a temperature in a range from $-1°$ C. to $-35°$ C.

20. The method according to claim 4 wherein the polyvinyl alcohol is present in an amount in a range from 2 to 20 wt %.

21. The method according to claim 20 wherein the polyvinyl alcohol is cooled to a temperature in a range from $-5°$ C. to $-15°$ C.

22. The method according to claim 4 wherein the polyvinyl alcohol is present in an amount of 4 to 12 wt %.

23. The method according to claim 22 wherein the polyvinyl alcohol is cooled to a temperature of $-8°$ C. to $-13°$ C.

24. A method of producing a hydrogel-based anatomical phantom of an anatomical part having components of different density using multi-stage freezing and a single thawing step, consisting essentially of the steps:
 a) providing a mold of an anatomical part;
 b) providing a constituent mold having a size and shape corresponding to a constituent part of the anatomical part, placing a liquid into the constituent mold;
 c) freezing the liquid in the constituent mold to produce a frozen constituent part;
 d) removing the frozen constituent part from the constituent mold and placing the frozen constituent part into the mold and supporting the frozen constituent part in a location in the mold corresponding to an actual location of the constituent part in an actual anatomical part;
 e) filling the mold with a hydrogel liquid precursor to encase the frozen constituent part in the hydrogel liquid precursor;
 f) freezing the hydrogel liquid precursor; and
 g) thawing the frozen constituent part and the frozen hydrogel liquid precursor together to produce a hydrogel enveloped thawed frozen constituent part having a continuous seam between the constituent of the anatomical part formed by the thawed frozen constituent part and a remainder of the anatomical part formed by the hydrogel, and wherein the liquid and the hydrogel liquid precursor have a composition selected such that upon being thawed together, a product of the thawed frozen constituent part and the hydrogel have different densities.

* * * * *